US012594755B1

(12) United States Patent
Gray

(10) Patent No.: US 12,594,755 B1
(45) Date of Patent: Apr. 7, 2026

(54) INDUSTRIAL PRINTING APPARATUS

(71) Applicant: Thomas Charles Gray, Henderson, NV (US)

(72) Inventor: Thomas Charles Gray, Henderson, NV (US)

( * ) Notice: Subject to any disclaimer, the term of this patent is extended or adjusted under 35 U.S.C. 154(b) by 220 days.

(21) Appl. No.: 18/484,647

(22) Filed: Oct. 11, 2023

Related U.S. Application Data

(60) Provisional application No. 63/415,315, filed on Oct. 12, 2022.

(51) Int. Cl.
*B41F 23/04* (2006.01)

(52) U.S. Cl.
CPC ...... *B41F 23/0453* (2013.01); *B41F 23/0456* (2013.01)

(58) Field of Classification Search
CPC ...... B41F 5/04; B41F 5/06; B41F 5/24; B41F 9/023; B41F 19/001; B41F 19/002; B41F 23/0453; B41F 23/0456; B65H 16/00; B65H 18/00; B41J 2202/20
See application file for complete search history.

(56) References Cited

U.S. PATENT DOCUMENTS

| | | | | |
|---|---|---|---|---|
| 6,401,608 | B1 | 6/2002 | Lyon et al. | |
| 6,443,058 | B1 | 9/2002 | Stadler et al. | |
| 7,100,507 | B1 | 9/2006 | Rochon et al. | |
| 9,568,862 | B2 | 2/2017 | Shmaiser et al. | |
| 10,293,623 | B2 | 5/2019 | Jentzsch et al. | |
| 2011/0132729 | A1* | 6/2011 | Chisholm | B41J 3/60 198/867.11 |
| 2014/0196621 | A1* | 7/2014 | Riescher | B41F 7/14 101/217 |
| 2015/0231875 | A1* | 8/2015 | Schuetze | B41F 13/02 101/143 |
| 2017/0109124 | A1* | 4/2017 | Haas | G09G 5/003 |
| 2019/0016111 | A1* | 1/2019 | Schwab | B41F 23/0409 |
| 2023/0294394 | A1* | 9/2023 | Murzynowski | B41J 11/0022 101/487 |

FOREIGN PATENT DOCUMENTS

| | | | |
|---|---|---|---|
| CN | 110722888 | A | 1/2020 |
| EP | 0589260 | A1 | 3/1994 |

* cited by examiner

*Primary Examiner* — Stephen D Meier
*Assistant Examiner* — Quang X Nguyen
(74) *Attorney, Agent, or Firm* — John Rizvi; John Rizvi, P.A.—The Patent Professor®

(57) ABSTRACT

The present invention provides an industrial printing apparatus for packaging roll material/substrates. The apparatus may include a water-based coating device, a UV treatment device, and a UV embellishment device. The apparatus may comprise an unwinding mechanism capable of receiving and unwinding a roll material/substrate; a rewind mechanism capable of providing roll to roll transmission of the material/substrate; a roll lift mechanism; a material webguide for retaining the roll material/substrate perfectly straight and inline; a servo tension control infeed; a corona treater; a servo tension control pull drive nip roller; at least one print station; at least one dryer; at least one drop-in unit capable of providing printing features including UV spot print/varnish, cold foil, cast and cure, textile effects and combinations thereof; and a servo outfeed nip roller. The apparatus increases efficiencies for printing packaging for edible food and beverage products on a large scale while saving significant operating time.

19 Claims, 6 Drawing Sheets

INDUSTRIAL PRINTING APPARATUS

CROSS-REFERENCE TO RELATED APPLICATIONS

This application claims the benefit of U.S. Provisional Patent Application No. 63/415,315, filed on Oct. 12, 2022, which is incorporated by reference herein in its entirety.

FIELD OF THE INVENTION

The present invention relates generally to industrial printers and machines for producing packaging material, and more particularly, to an industrial printing apparatus for printing packaging material.

BACKGROUND OF THE INVENTION

Printing of packaging materials is an important sector of the printing industry. Yet options for printing packaging materials are not keeping pace with packaging industry needs.

First of all, time is an important consideration. Printing packaging materials may take weeks or even months to complete. This burdens companies with delays in getting products to market and to consumers. Time considerations have only increased in recent years due to growing supply chain and shipping issues.

Second, current options for printing packaging materials involve materials and processes which may be hazardous to printing professionals. Resulting packaging products also have health risks which may affect not only the printing professionals who produce the packaging materials, but also all who encounter the packaging materials from the supply chain, through the packagers and shippers, and down to the consumers.

Third, printed packaging materials produced by current options have a clear impact on the environment. The same options that may impose health risks to people have a clear environmental impact.

Cost in every sense is a consideration. In addition to time, health and safety and environmental costs, there is always the bottom line to consider. The monetary cost of printing is significant. Moreover, the same printers that take weeks or months to provide results may also operate at a significant cost that is passed down to the customer.

In addition, the packaging of edible food products such as ready to eat (RTE) foods, staple food and ingredient products, and beverages in package materials having an interior surface which contacts food products and present special added challenges to minimize handling and complying with FDA rules and regulations regarding substrates, inks and coatings.

These issues have motivated the exploration of alternatives including manufacturers of goods seeking options for printing their packaging "in house". However, options are few and do not meet the needs of those looking for printing options.

Press assemblies exist which include multiple inkjet processing stations for the processing of sheets. These processing stations may be arranged in succession in a transport direction of the sheets for inline processing of the sheets. The processing stations may include individually controlled non-impact inkjet printing units and a downstream drying processing station. These large complicated systems are expensive, inefficient and time-consuming to operate. Further, such systems do not address the needs of quickly, efficiently printing on durable packaging substrate materials and do not have the ability to produce high resolution, high quality printed images.

Combined processes exist for printing with two ink systems. A printing material may be printed with a solvent-based or radiation-curing ink and then with at least one offset-typical ink. The printing machine for inline implementation of the combined processes is a hybrid press, having a flexo printing unit and a downstream offset printing unit. A UV, electron-beam or air-stream dryer is integrated into the flexo printing unit, or a UV, electron-beam or airstream drying unit is arranged between the flexo printing unit and the offset printing unit. These options are cumbersome, require multiple separate machines, and do not adequately address the need for printing packaging materials and present a concern for health and safety, and for the environment.

Digital printing systems exist having two independently operable printing towers arranged in a series such that a substrate sheet passes sequentially through both printing towers, and in which a perfecting mechanism is provided between the two towers to reverse each substrate sheet during transfer from the first printing tower to the second printing tower. The perfecting mechanism is selectively operable to enable the second tower to print either on the same side of each substrate sheet as the first tower or on the opposite side of each substrate sheet. The system may allow a duplex mode, and may provide a higher speed simplex mode during which different separations of the same image are printed by the two towers. This type of system does not address the needs of printing packaging materials. Further, options of this type are cumbersome and slow, cause jams, and are not well suited to printing of more durable packaging materials.

Further, flexographic printing machines of modular construction exist which for example include a frame that supports a printing unit, and a UV radiation and cooling unit including a UV radiator and a cooling cylinder for printing a web of plastic film or metal foil with ink. The web is wrapped around the cooling cylinder and the ink hardens under UV radiation. Such options are cumbersome and are limited to web substrates.

Ideally, it would be extremely useful to be able to increase printing efficiencies on a large scale while saving significant operating time and cost. Further it would be beneficial to provide an environmentally friendly way to accomplish these goals.

A long-felt unresolved need exists for effective options which provide the following beneficial aspects: increase of printing efficiencies on a large scale; simplified equipment operation; minimizing needed space and footprint of equipment; saving significant operating time; and providing these attributes in an environmentally friendly manner.

A long-felt unresolved need also exists for packaging materials and processes for edible food and beverage products which minimizes handling of the packaging and protects the interior package surface which contacts food products from contamination; and further complies with FDA rules and regulations regarding substrates, inks and coatings for food products.

Accordingly, there is need for a solution to at least one of the aforementioned problems. For instance, there is an established need for an industrial printer or industrial printing apparatus for printing packaging material which provides increased efficiency, decreased operating time, decreased overall cost, increased energy efficiency, and decreased environmental impact. There is also an established need for packaging materials and processes for edible food and beverage products which minimizes handling, protects against contamination, and is FDA compliant.

SUMMARY OF THE INVENTION

The present invention is directed to an industrial printing apparatus. The apparatus may include a combination of a water-based coating device, a UV treatment device, and a UV embellishment device.

In one aspect, the present invention provides an unprecedented industrial printing apparatus for printing packaging material which provides multiple benefits. These benefits include increase of printing efficiencies on a large scale; simplified equipment operation; minimizing needed space and footprint of equipment; saving significant operating time; and providing these attributes in an environmentally friendly manner. The present invention also beneficially provides an unprecedented solution to an unmet need for packaging materials and processes for edible food and beverage products which minimizes handling of the packaging; protects the interior package surface which contacts food products from contamination; and further complies with FDA rules and regulations regarding substrates, inks and coatings for food products.

In one aspect, the industrial printing apparatus of the present invention is capable of running a wide variety of pre-printed materials/substrates, such as, for example without limitation, PS Label, unsupported film, card, tag, board stock, pre laminated pouch material (PET/MET/PE), or the like, from about 1 mil to about 20 mil in thickness.

In one aspect, the present invention provides an unprecedented solution which addresses and solves important problems in the printing industry. The present invention in one aspect provides three important functions in a single device. The present invention eliminates the need for three devices, and the associated waste of materials, and space. This unprecedented solution distinguishes over current options that are unable to provide these benefits.

In one aspect, the present system and process permits the material/substrate to be pre-coated or embellished in a manner wherein the neither the coating nor the embellished surface will ever touch or contaminate the inner layer surface that comes in contact with the product like food, liquid during the end process of finishing or converting.

In one aspect, the present system remains compliant with FDA rules and regulations applicable to ink, coating, UV varnish migration through the construction and barriers required with the materials/substrates being used.

In one aspect, the system of the present invention is capable of being operated as a standalone system, or in-line with additional equipment. The present invention is not an add-on or bolt-on device. The system of the present invention may be provided on wheels to allow it to be portable and moved to a variety of different types of finishing or converting machines. A nonlimiting example of such a finishing or converting machine is an existing die-cutting machine.

In a first implementation, the present invention provides an industrial printing apparatus which comprises a water-based coating device, a UV treatment device, and a UV embellishment device. The apparatus comprises an unwinding mechanism capable of receiving and unwinding a roll material/substrate; a rewind mechanism capable of providing a roll to roll transmission of the material/substrate; a roll lift mechanism; a material webguide configured to retain the roll material/substrate perfectly straight and inline; a servo tension control infeed; a corona treater; a servo tension control pull drive nip roller; at least one print station; at least one dryer; at least one drop-in unit capable of providing printing features selected from UV spot print/varnish, cold foil, cast and cure, textile effects and combinations thereof; and a servo outfeed nip roller.

In one aspect, the roll material/substrate may comprise a pre-printed material/substrate.

In one aspect, the industrial printing apparatus is compliant with FDA rules and regulations applicable to ink, coating, UV varnish migration through the construction and barriers required with the materials/substrates being used, the printing apparatus is configured to maintain the roll material/substrate in an uncontaminated state during processing, and the roll material/substrate may comprise a food-safe and beverage-safe material.

In one aspect, the pre-printed materials/substrates may comprise PS Label, unsupported film, card, tag, board stock, pre laminated pouch material (PET/MET/PE).

In one aspect, the roll material/substrate may be made of 100% Recyclable PET.

In one aspect, the roll material/substrate may be made of a material selected from PET, PET/EVA, RPET, METPET, PCR, PLA, METBOPET/PE, metallized BOPET/PE, mylar and combinations thereof.

In one aspect, the roll material/substrate may be made of kraft paper.

In one aspect, the roll material may be made of 100% recyclable paper.

In one aspect the roll material/substrate may be made of plastic-free paper.

In one aspect the roll material/substrate may be made of a material that is bio-based and fully compostable.

In one aspect, the roll material/substrate may comprise a material selected from earth/biobased films, backyard compostable films, earth/marine degradable films, hemp paper, hemp bioplastic and combinations thereof.

In one aspect, the roll/material substrate may have a thickness from about 1 mil to about 20 mil.

In a further aspect, the roll/material substrate may have a roll diameter of up to about 800 mm (up to about 32"), and may be loaded on a 3" core or a 6" core.

In one aspect, the at least one print station may be selected from a flexo spot print station, a flood coating print station and combinations thereof.

In one aspect, the at least one dryer may comprise a plurality of dryers.

In another aspect, the at least one dryer may comprise four dryers.

In another aspect, the at least one dryer may be selected from R/hot air dryers, LED UV dryers and combinations thereof.

In one aspect, the at least one dryer may comprise a compact dryer capable of making extra space for additional in-line embellishment options.

In one aspect, the at least one drop-in unit capable of providing printing features comprises a UV spot print/varnish apparatus.

In one aspect, the at least one drop-in unit capable of providing printing features comprises a cold foil apparatus.

In one aspect, the at least one drop-in unit capable of providing printing features comprises a cast and cure apparatus.

In one aspect, the at least one drop-in unit capable of providing printing features comprises a textile effects apparatus.

In one aspect, the servo outfeed nip roller is capable of use to convey an embellished pre-printed material/substrate into a finishing or converting equipment unit when it is desired to run the material/substrate directly into the finishing or converting equipment unit.

In one aspect, the roll material/substrate is capable of further processing to provide a food-safe and beverage safe package.

In one aspect, the roll material/substrate may be used to provide a food-safe and beverage-safe package comprising a child-resistant zip package, a plastic-free paper pouch, a recyclable PET pouch, a kraft pouch, a mylar pouch, a hemp pouch, a compostable pouch, a biobased pouch, a soft touch pouch, a window pouch, and combinations thereof.

In one aspect, the present invention provides an industrial printing apparatus capable of processing a pre-printed material/substrate provided on a roll having a roll diameter of up to about 800 mm (up to about 32"), on a core of between about 3"-6", the apparatus comprising:

an unwinding mechanism;

an unwinding mechanism capable of receiving and unwinding the material/substrate;

a rewind mechanism capable of providing a roll to roll transmission of the material/substrate;

a roll lift mechanism;

a material webguide configured to retain the roll material/substrate perfectly straight and inline;

a servo tension control infeed;

a corona treater;

a servo tension control pull drive nip roller;

a coating print station selected from a flexo spot print station and a flood coating print station;

at least one compact dryer selected from JR/hot air dryers, LED UV dryers and combinations thereof; r in-line embellishment options);

at least one drop-in in-line embellishment unit capable of providing printing features selected from UV spot print/varnish, cold foil, cast and cure, textile effects and combinations thereof; and a servo outfeed nip roller capable of use to convey a processed embellished pre-printed material/substrate directly to a separate finishing or converting equipment unit.

In some embodiments, the industrial printing apparatus may comprise a thermal laminator machine and a flexo coater machine for application of water-based coating. The flexo coater machine may be configured to control a plurality of devices removably mounted thereon. The plurality of devices may include a spot UV cast and cure assembly comprising an inkjet spot varnish machine, a LED UV cure machine and at least one removable AQ/IR dryer, and a slitter rewinder machine. The flexo coater machine may be configured to control the spot UV cast and cure assembly and the slitter rewinder machine. The printing apparatus of the present invention may provide effective efficient printing including but not limited to water-based and UV with digital embellishment. The printing apparatus may include a flood coater for the water-based adhesive. The printing apparatus may include removable hot air dryers. The printing apparatus may include optional drop-in LED UV system components. The printing apparatus may provide UV curing on the material/substrate. The printing apparatus is capable of providing UV-embellishment for individual spot UV treatment. The UV embellishment may comprise "Spot/Cast & Cure Option", a type of printing which may print patterns and texture. The printing apparatus may be beneficially used to provide water-based coating, UV treatment, and UV embellishment.

In one aspect, the present invention meets a long-felt unresolved need in the printing industry. The system and method of the present invention allows the material/substrate to be pre-coated or embellished and the coating or embellished surface will never touch or contaminate the inner layer surface that comes in contact with the product like food, liquid during the end process of finishing or converting. The system and method maintains compliance with FDA rules and regulations regarding ink, coating UV varnish migration through the construction and barriers required with the materials/substrates being used. The system and method provide an unprecedented improvement over previous solutions, which is more efficient and faster, being able to complete printing jobs in a single day as opposed to previous printing solutions which take weeks or months to complete the same job. The present invention thereby optimizes production and minimizes overhead. The present invention reduces waste, optimizes production by providing innovative solutions employing environmentally friendly materials and production practices.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
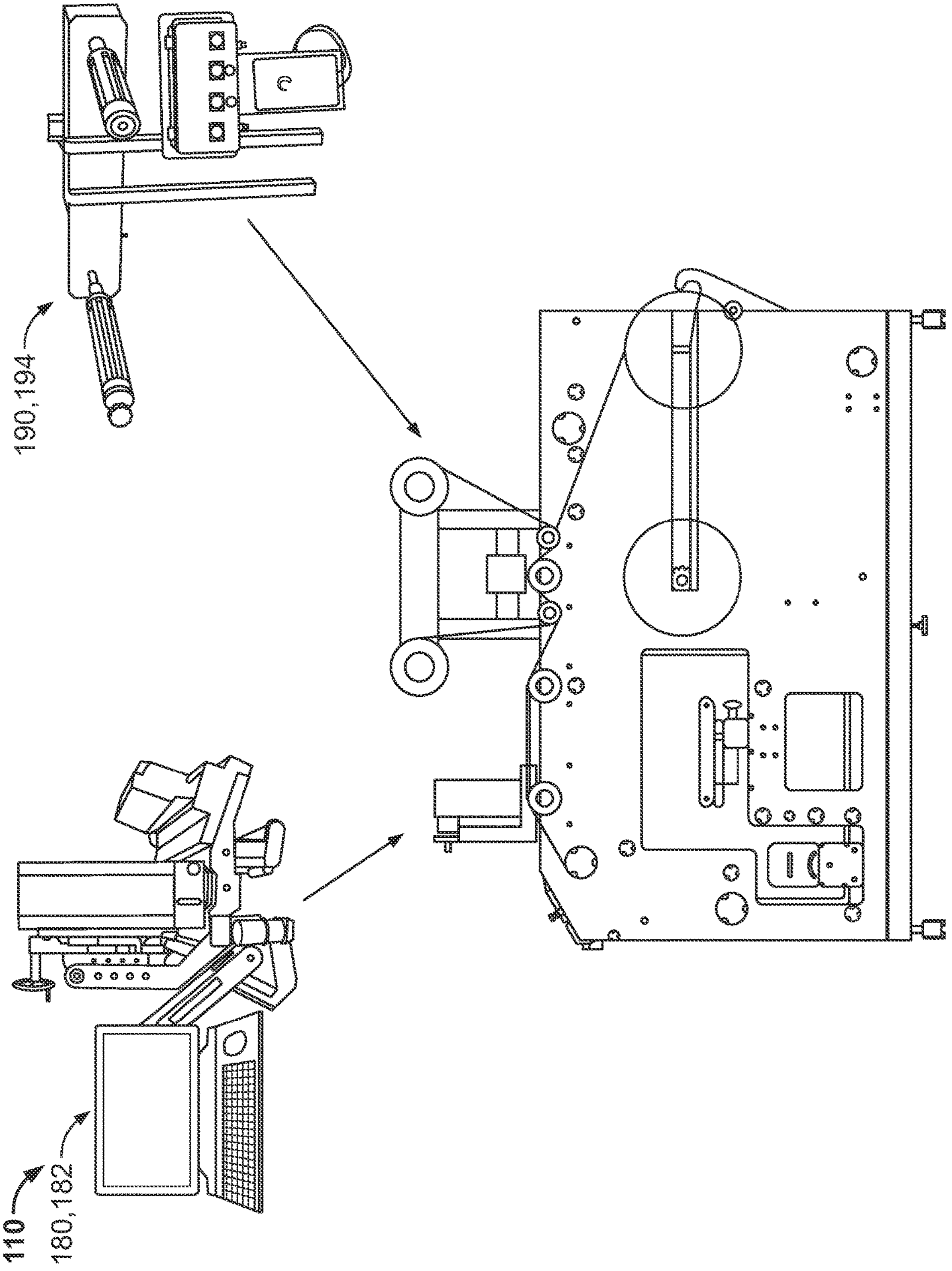
FIG. 1 presents a schematic view of an industrial printing apparatus in accordance with the present invention.
Figure 2A:
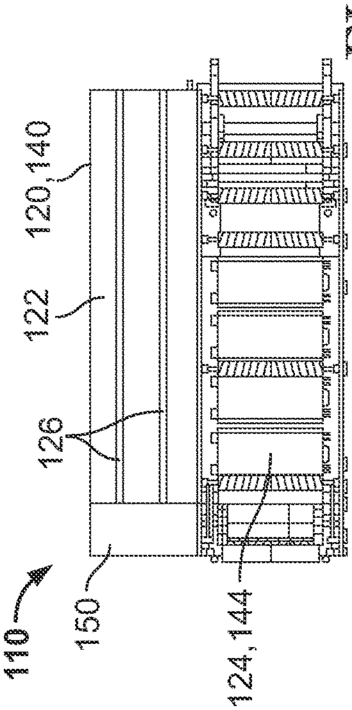
FIG. 2A presents a top schematic view of an industrial printing apparatus in accordance with the present invention.
Figure 2B:
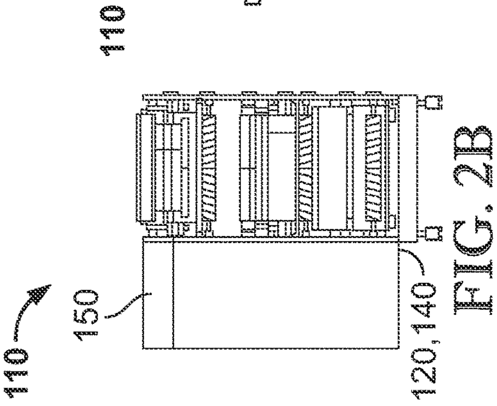
FIG. 2B presents a left side schematic view of the industrial printing apparatus in accordance with the present invention.
Figure 2C:
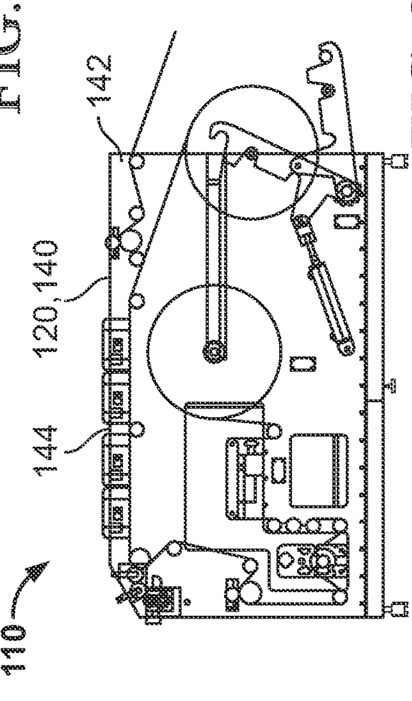
FIG. 2C presents a front schematic view of the industrial printing apparatus in accordance with the present invention.
Figure 2D:
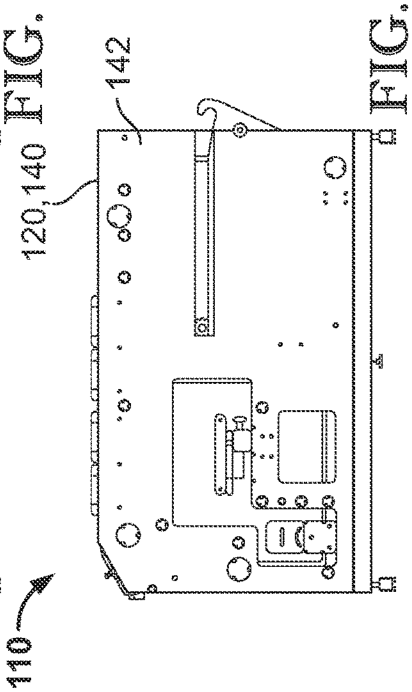
FIG. 2D presents a front schematic view of the industrial printing apparatus as in FIG. 2C showing the interior with no material substrate or roll substrate therein.
Figure 2E:
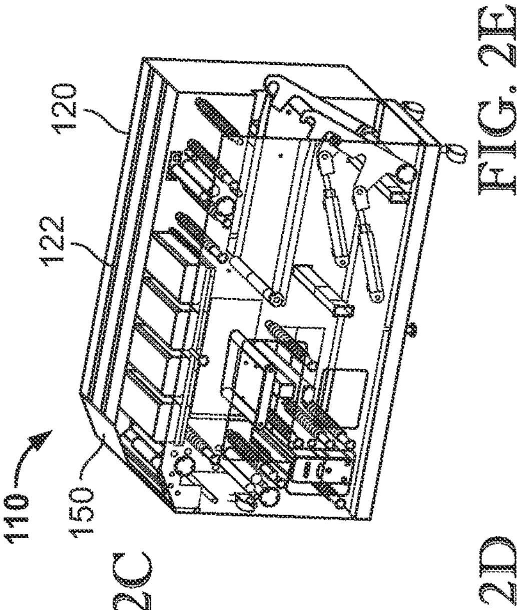
FIG. 2E presents a perspective schematic view of an industrial printing apparatus in accordance with the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to an industrial printing apparatus for processing a material substrate, which may be a roll material/substrate, for aseptic packaging, in an uncontaminated state for use as FDA-compliant food-safe and beverage-safe packaging for edible food and beverage products. The industrial printing apparatus is configured to maintain the roll material/substrate in an uncontaminated state during processing. The present system and process permits the material/substrate to be pre-coated or embellished in a manner wherein the neither the coating nor the embellished surface will ever touch or contaminate the inner layer surface that comes in contact with the product like food, liquid during the end process of finishing or converting. The industrial printing apparatus is compliant with FDA rules and regulations applicable to ink, coating, UV varnish migration through the construction and barriers required with the materials/substrates being used. The industrial printing apparatus may include a combination of a water-based coating device, a UV treatment device, and a UV embellishment device. The industrial printing apparatus may be useful for increasing printing efficiencies on a large scale while saving significant operating time.

Referring initially to FIGS. 1, 2A-E, 3-4, 5A-B and 6, an industrial printing apparatus 110 (hereinafter printing apparatus 110), for processing a material substrate 114, which may be a roll material/substrate 116, is shown.

At FIG. 1, the printing apparatus 110 is shown with a printing system 300. The printing apparatus 110 comprises a printing apparatus housing 120. As is best seen at FIGS. 2A-E and FIG. 3, the printing apparatus housing 120 has a top panel 122, a bottom panel 128, a front panel 130, a rear panel 132, a left side panel 136, and a right side panel 138, which define a housing exterior 140 and a housing interior 142. The housing panels 122,128,130,132,136,138 may be removable to provide access to the housing interior 142.

The printing apparatus housing may also include at least one housing drop-in cavity 144. In some embodiments, there may be between one and four housing drop-in cavities 144. The housing drop in cavities 144 may be accessed by corresponding drop-in openings 124 provided at the top panel 122.

The housing top panel may further comprise mounting rails 126 configured for mounting and supporting equipment, such as, for example without limitation, digital embellishment equipment and cold foil unwind/rewind units. The rails 126 may comprise a plurality of mounting rails 126. For example, with reference to FIGS. 2A and 2E, in some embodiments, the mounting rails 126 comprise a pair of mounting rails 126. The mounting rails 126 may be configured to support equipment and enable the equipment to be slidably mounted thereon so that the position of the equipment on the mounting rails 126 may be slidably adjusted.

The printing apparatus housing may also include housing legs 146 connected to and extending downwardly from the bottom panel 128, and housing feet 148 connected to and extending downwardly from the housing legs 146. The housing may also comprise a control panel 150.

Figure 3:
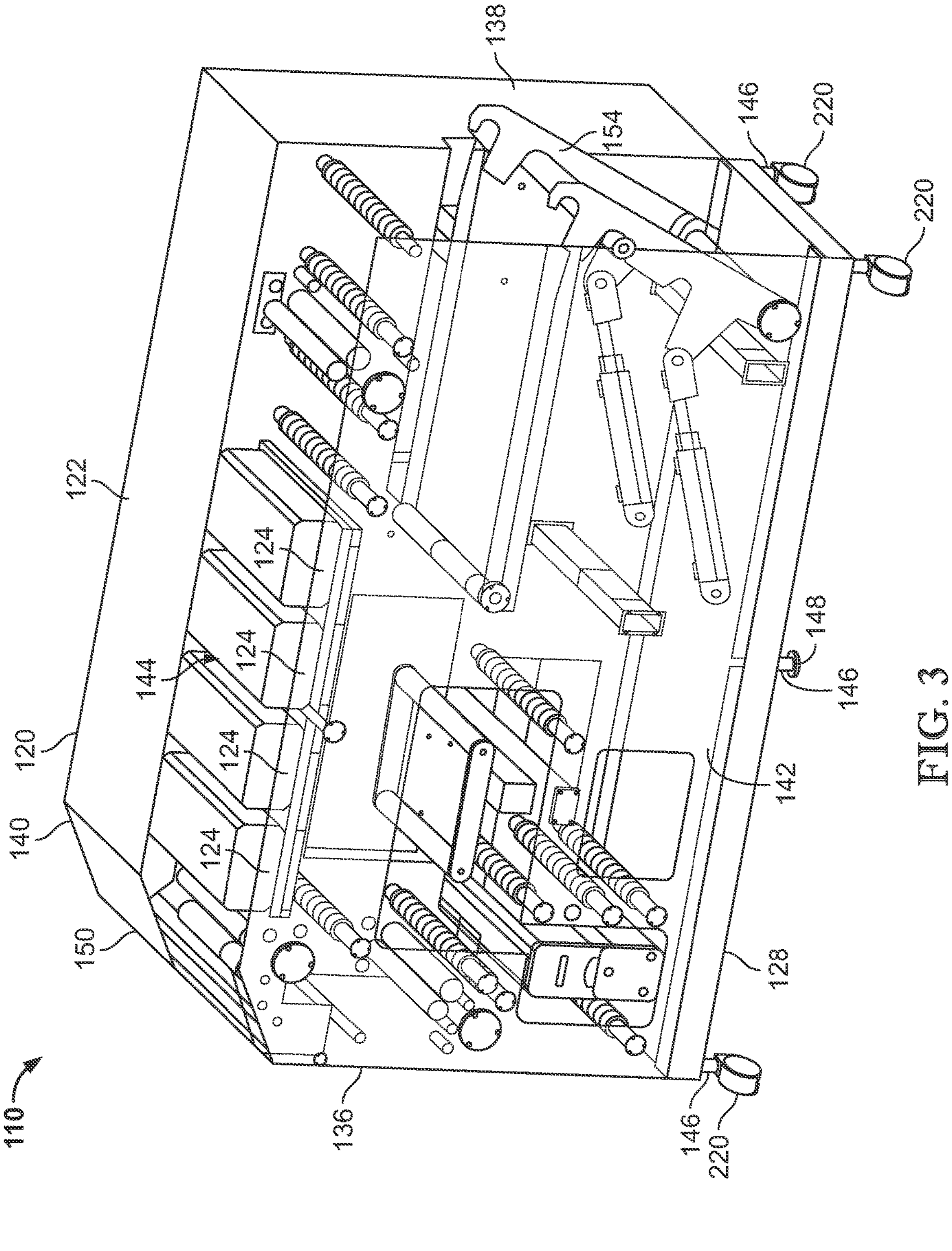
FIG. 3 presents a schematic view of an industrial printing apparatus in accordance with a first illustrative embodiment of the present invention.

As shown at FIG. 3, the housing legs may have wheels 220, which may be mounted to directly to the housing legs 146 (instead of the housing feet 148), or may alternatively be mounted to the housing feet 148. The wheels 220 may be any suitable wheels. The wheels 220 may be permanently installed, or removable and replaceable wheels. The wheels 220 may be mounted to the housing legs 146 or to the housing feet 148. Alternative embodiments are contemplated in which one or more wheels of the industrial printing apparatus are multidirectional wheels, i.e. wheels capable of imparting rolling mobility to the apparatus 110 in multiple directions and not just a longitudinal direction as shown in the present drawings. For instance, the one or more multidirectional wheels can include one or more swivel casters, spherical wheels, or the like.

Figure 4:
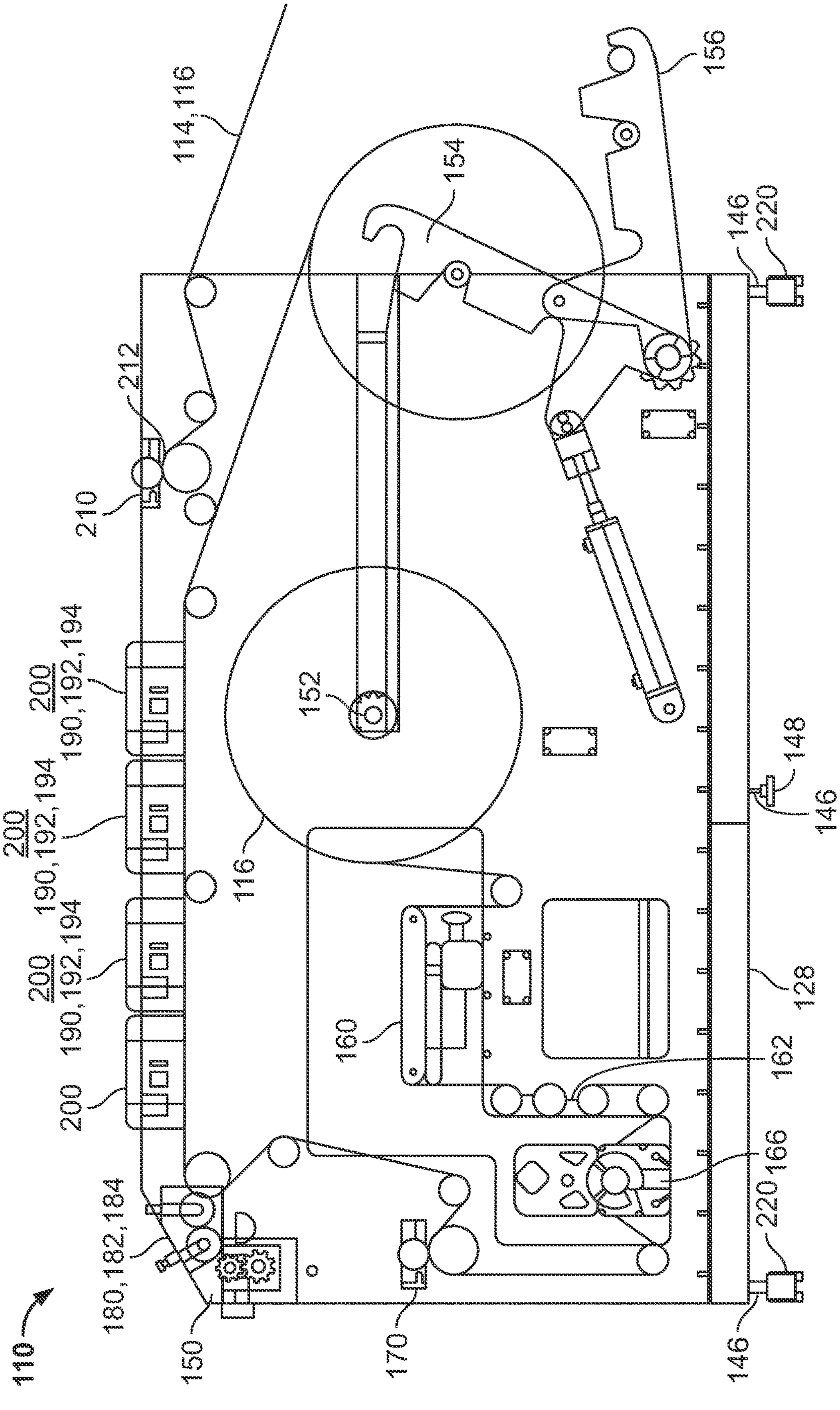
FIG. 4 presents a cross-sectional view of the interior of the printing apparatus illustrated in FIG. 3.

Referring now to FIG. 4, the printing apparatus 110 may comprise an unwinding mechanism 152 capable of receiving and unwinding a roll material/substrate 116, a rewind mechanism 154 capable of providing a roll to roll transmission of the roll material/substrate 116, a roll lift mechanism 156, a material webguide 160 configured to retain the roll material/substrate 116 perfectly straight and inline, a servo tension control infeed 162, a corona treater 166, a servo tension control pull drive nip roller 170, at least one print station 180, at least one dryer 190, at least one drop-in unit 200 capable of providing printing features selected from UV spot print/varnish, cold foil, cast and cure, textile effects and combinations thereof, and a servo outfeed nip roller 210.

The printing apparatus 110 is capable of running a wide variety of material/substrates 114. The material/substrates 114 may comprise a food-safe and beverage-safe material. The materials/substrates 114 may include pre-printed materials/substrates, such as, for example without limitation, PS Label, unsupported film, card, tag, board stock, pre laminated pouch material (PET/MET/PE), or the like. The material/substrate 114 may be made of a material selected from PET, PET/EVA, RPET, METPET, PCR, PLA, METBOPET/PE, metallized BOPET/PE, mylar and combinations thereof. The material/substrate 114 may be made of 100% Recyclable PET. The material/substrate 114 may be made of plastic-free paper. The material/substrate 114 may be made of kraft paper. The material substrate 114 may be made of 100% recyclable paper. The material/substrate 114 may be made of a material that is bio-based and fully compostable. The material/substrate 114 may comprise a material selected from earth/biobased films, backyard compostable films, earth/marine degradable films, hemp paper, hemp bioplastic and combinations thereof.

The materials/substrates 114 may have any suitable dimensions. In some embodiments, the materials/substrates 114 may have a thickness from about 1 mil to about 20 mil.

The roll/material substrate 116 may include materials/substrates having a thickness from about 1 mil to about 20 mil, and may have a roll diameter of up to about 800 mm (up to about 32"), and may be loaded on a 3" core or a 6" core.

In some embodiments, the present invention provides a printing apparatus capable of processing a pre-printed material/substrate provided on a roll having a roll diameter of up to about 800 mm (up to about 32"), on a core of between about 3"-6".

The unwinding mechanism 152 and the rewind mechanism 154 may provide roll to roll transmission of the roll material/substrate 116, enabling a user to run the roll material/substrate from roll to roll within the printing apparatus 110. The roll lift mechanism 156 enables a user to position the roll in the printing apparatus 110. The material webguide 160 is constructed and arranged to maintain the position of the roll material/substrate 116 perfectly straight and inline.

The at least one print station 180 may be a plurality of print stations. The print station 180 may be any suitable print device. For example without limitation, the print station 180 may be selected from a flexo spot print station 182, a flood coating print station 184 and combinations thereof. The print station 180 may be associated with a computing system.

The at least one dryer 190 may comprise a plurality of dryers. The at least one dryer may comprise four dryers. The at least one dryer 190 may be selected from IR/hot air dryers 192, LED UV dryers 194 and combinations thereof. In some embodiments, the at least one dryer 190 may comprise a compact dryer capable of making extra space for additional in-line embellishment options.

As noted hereinabove, the housing top panel may further comprise mounting rails 126 configured for mounting equipment. The mounting rails 126 may beneficially be used to removably support a plurality of devices thereon to enable the devices to be slidably positioned and adjusted. Nonlimiting examples of the devices which may be mounted on the mounting rails 126 may include digital embellishment equipment and cold foil unwind/rewind units. In some embodiments, the mounting rails 126 may be used to attach and support the at least one print station 180, the at least one dryer 190, or other equipment. For example, the mounting rails 126 may be used to attach and support both the Digital Inkjet embellishment and cold foil units with the ability to slide when required. In some embodiments, the mounting rails 126 may support any suitable device, including but not limited to a thermal laminator machine, a flexo coater machine, a spot UV cast and cure assembly comprising an inkjet spot varnish machine, a LED UV cure machine, a removable AQ/IR dryer, a slitter rewinder machine, or the like. The mounting rails 126 make the industrial printing apparatus service friendly, and may permit the installation of additional equipment to the industrial printing apparatus at a later date in the field.

The at least one drop-in unit 200 may be a unit capable of providing one or more printing features selected from UV spot print/varnish, cold foil, cast and cure, textile effects and combinations thereof. The at least one drop-in unit may comprise a UV spot print/varnish apparatus. In some embodiments, the at least one drop-in unit may comprise a cold foil apparatus. In other embodiments, the at least one drop-in unit may comprise a cast and cure apparatus. The at least one drop-in unit may comprise a textile effects apparatus.

Alternative embodiments are contemplated in which one or more additional treatment or embellishment machines are provided, which may be removably installed on the printing apparatus 110. These may be provided as the at least one drop-in unit 200. For instance, additional water-based coating, UV treatment, and UV embellishment machines may be removably installed, such as, for example without limitation, machines which provide individual spot UV treatment, "Spot/Cast & Cure Option", a type of printing which may print patterns and texture, or the like. As noted hereinabove, additional devices may also be installed on the mounting rails 126.

The servo tension control elements 162,170,210 maintain the tension of the roll material/substrate 116 throughout the printing apparatus 110. The servo outfeed nip roller 210 is capable of use to convey an embellished pre-printed material/substrate into a finishing or converting equipment unit when it is desired to run the material/substrate directly into the finishing or converting equipment unit.

The material/substrate 114 is capable of further processing to provide a food-safe and beverage safe package. In one aspect, the roll material/substrate may be used to provide a food-safe and beverage-safe package comprising a child-resistant zip package, a plastic-free paper pouch, a recyclable PET pouch, a kraft pouch, a mylar pouch, a hemp pouch, a compostable pouch, a biobased pouch, a soft touch pouch, a window pouch, and combinations thereof.

Figure 5A:
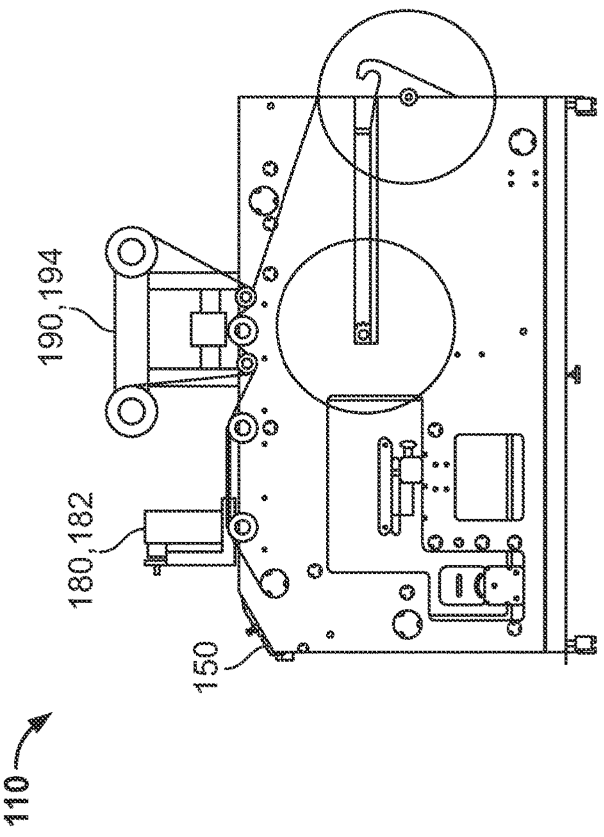
FIG. 5A presents a schematic view of the industrial printing apparatus in accordance with the present invention.
Figure 5B:
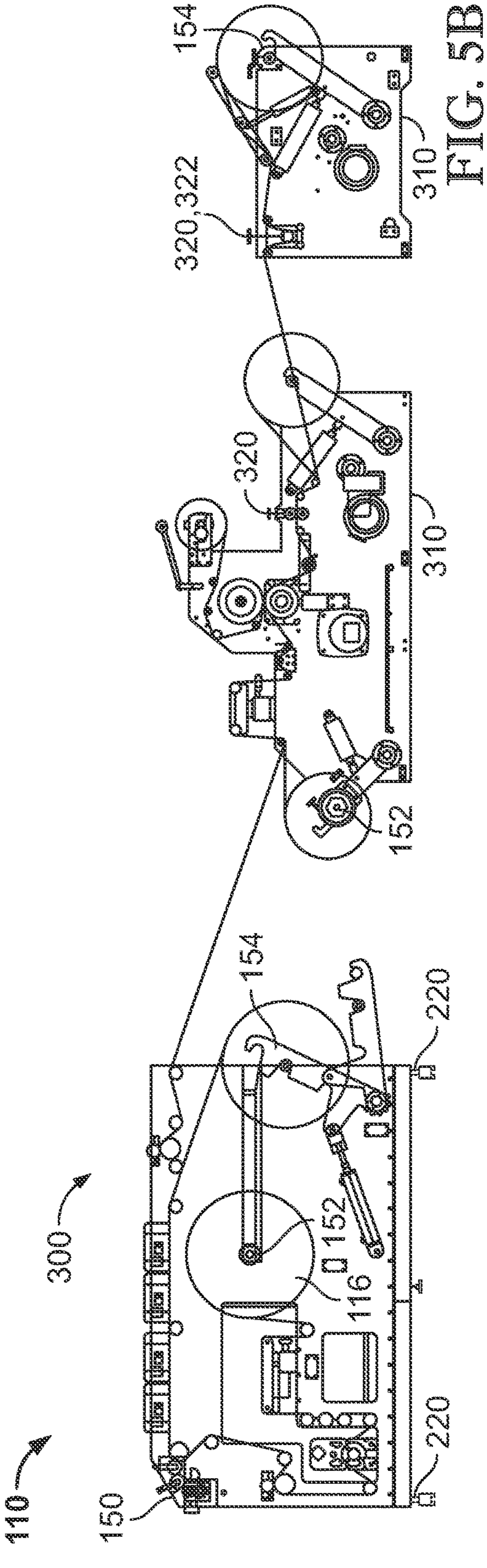
FIG. 5B presents a schematic view of an overall printing system including the industrial printing apparatus in accordance with the present invention.

The printing apparatus 110 is not an add-on or bolt-on device. The printing apparatus 110 of the present invention is capable of being operated as a standalone system, for example, as shown at FIG. 1 and FIG. 5A. The printing apparatus 110 is also capable of being operated in-line with additional equipment. For example, as shown at FIG. 1, the printing apparatus 110 may be part of a printing system 300 including at least one suitable separate unit 310.

Figure 6:
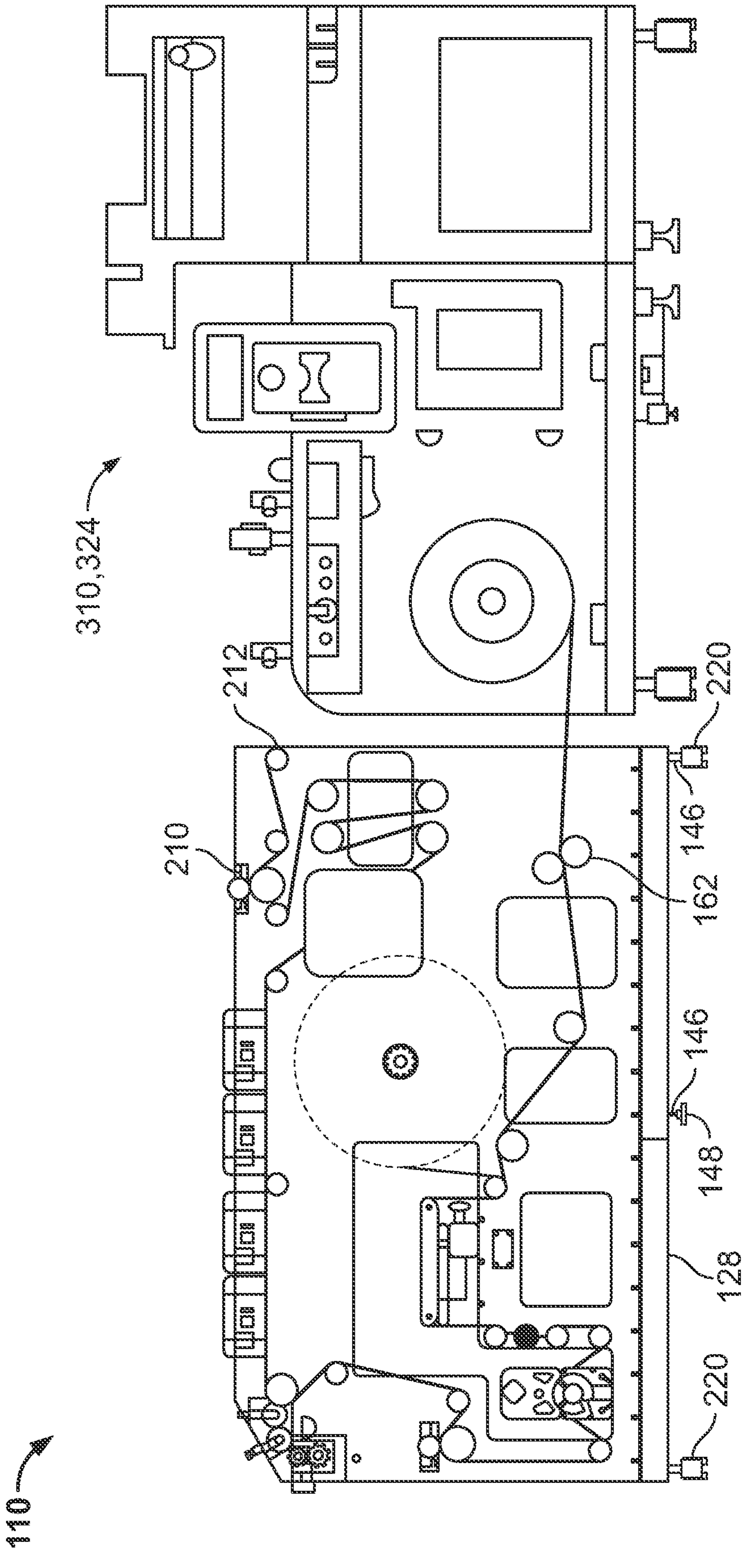
FIG. 6 presents a schematic view of the industrial printing apparatus of the present invention, conveying a printing substrate to an external finishing machine.

As noted hereinabove, the printing apparatus 110 may be provided on wheels 220 which enable the printing apparatus 110 to be portable and moved to a variety of different types of separate units 310, nonlimiting examples of which may be finishing or converting machines that may be part of the system 300. The nip roller 210 may convey a processed embellished pre-printed material directly from the printing apparatus 110 to any suitable separate finishing or converting unit 310. As shown at FIG. 5, the separate unit 310 may be a slitting machine 320 or an existing die-cutting machine 322. As shown at FIG. 6, the separate unit 310 may be a finishing machine 324 which may convey material to the printing apparatus 110 by the servo infeed 162. As such, the printing apparatus may be configured to receive material from another apparatus in addition to being capable of conveying material to the other apparatus. In some embodiments, the system 300 may therefore comprise two or more printing apparatuses 110. The rewind mechanism 154 may provide roll to roll transmission of the roll material/substrate 116, enabling a user to run the roll material/substrate from roll to roll within the printing apparatus 110. The unwinding mechanism 152 and the rewind mechanism 154 enable the roll to roll transmission of roll material/substrate 116 not only within the printing apparatus 110, but also between printing apparatuses 110 or the printing apparatus and a separate unit 310.

In one embodiment, the present invention may provide an industrial printing apparatus capable of processing a pre-printed material/substrate provided on a roll having a roll diameter of up to about 800 mm (up to about 32"), on a core of between about 3"-6", the apparatus comprising:

an unwinding mechanism;

an unwinding mechanism capable of receiving and unwinding the material/substrate;

a rewind mechanism capable of providing a roll to roll transmission of the material/substrate;

a roll lift mechanism;

a material webguide configured to retain the roll material/substrate perfectly straight and inline;

a servo tension control infeed;

a corona treater;

a servo tension control pull drive nip roller;

a coating print station selected from a flexo spot print station and a flood coating print station;

at least one compact dryer selected from IR/hot air dryers, LED UV dryers and combinations thereof;

at least one drop-in in-line embellishment unit capable of providing printing features selected from UV spot print/varnish, cold foil, cast and cure, textile effects and combinations thereof; and a servo outfeed nip roller capable of use to convey a processed embellished pre-printed material/substrate directly to a separate finishing or converting equipment unit.

The present invention may provide an industrial printing apparatus which comprises a thermal laminator machine and a flexo coater machine for application of water-based coating. The flexo coater machine is configured to control a plurality of devices removably mounted thereon. The plurality of devices includes a spot UV cast and cure assembly comprising an inkjet spot varnish machine, a LED UV cure machine and at least one removable AQ/IR dryer, and a slitter rewinder machine. The flexo coater machine is configured to control the spot UV cast and cure assembly and the slitter rewinder machine. The present invention may provide effective efficient printing including but not limited to water-based and UV with digital embellishment. The apparatus may include a flood coater for the water-based adhesive. The apparatus may include removable hot air dryers. The apparatus may include optional drop-in LED UV system components. The apparatus may provide UV curing on the material/substrate. The apparatus is capable of providing UV-embellishment for individual spot UV treatment. The UV embellishment may comprise “Spot/Cast & Cure Option”, a type of printing which may print patterns and texture. The printing apparatus may be beneficially used to provide water-based coating, UV treatment, and UV embellishment.

In some embodiments operation of the industrial printing apparatus and methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API). In some embodiments, the computing system may be accessible by the control panel 150 and/or the print station 180.

The many advantages of the unprecedented industrial printing apparatus of the present invention are detailed hereinabove. To briefly summarize, these benefits include increase of printing efficiencies on a large scale; simplified equipment operation; minimizing needed space and footprint of equipment; saving significant operating time; and providing these attributes in an environmentally friendly manner. The present invention also beneficially provides an unprecedented solution to an unmet need for packaging materials and processes for edible food and beverage products which minimizes handling of the packaging; protects the interior package surface which contacts food products from contamination; and further complies with FDA rules and regulations regarding substrates, inks and coatings for food products. The present invention allows the material/substrate to be pre-coated or embellished and the coating or embellished surface will never touch or contaminate the inner layer surface that comes in contact with the product like food, liquid during the end process of finishing or converting. The present invention maintains compliance with FDA rules and regulations regarding ink, coating UV varnish migration through the construction and barriers required with the materials/substrates being used. The present invention reduces waste, optimizes production by providing innovative solutions employing environmentally friendly materials and production practices, while eliminating the need for multiple devices, and the associated waste of materials, and space. This unprecedented solution distinguishes over current options that are unable to provide these and other benefits.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An industrial printing apparatus for processing a roll material substrate for aseptic packaging, the apparatus comprising:

an unwinding mechanism capable of receiving and unwinding a roll material/substrate;

a rewind mechanism capable of providing a roll to roll transmission of the material/substrate;
a roll lift mechanism;
a material webguide configured to retain the roll material/substrate perfectly straight and inline;
a servo tension control infeed;
a corona treater;
a servo tension control pull drive nip roller;
at least one print station;
at least one dryer;
at least one drop-in unit capable of providing printing features selected from UV spot print/varnish, cold foil, cast and cure, textile effects and combinations thereof, and
a servo outfeed nip roller;
wherein the industrial printing apparatus is configured to print and process the material/substrate while maintaining the material/substrate in an uncontaminated state for use as FDA-compliant food-safe and beverage-safe packaging for edible food and beverage products;
wherein the apparatus comprises:
a printing apparatus housing having a top panel, a bottom panel, a front panel, a rear panel, a left side panel, and a right side panel, wherein the top panel, the bottom panel, the front panel, the rear panel, the left side panel and the right side panel define a housing exterior and a housing interior, and wherein the top panel, the bottom panel, the front panel, the rear panel, the left side panel and the right side panel are removable to provide access to the housing interior;
wherein the housing further comprises at least one drop-in cavity accessible by a corresponding drop-in opening provided in the top panel;
wherein the top panel further comprises a plurality of mounting rails configured for mounting and supporting equipment; and
wherein the housing further comprises a control panel.

2. The industrial printing apparatus of claim 1 wherein the at least one printing station is selected from a flexo spot print station and a flood coating print station.

3. The industrial printing apparatus of claim 2 wherein the at least one compact dryer is selected from IR/hot air dryers, LED UV dryers and combinations thereof.

4. The industrial printing apparatus of claim 3 wherein the at least one drop-in unit comprises an in-line embellishment unit.

5. The industrial printing apparatus of claim 4 wherein the servo outfeed nip roller is capable of use to convey a processed embellished pre-printed material/substrate directly to a separate finishing or converting equipment unit.

6. The industrial printing apparatus of claim 5 wherein the apparatus is configured for processing a pre-printed material/substrate provided on a roll having a roll diameter of up to about 800 mm (up to about 32"), on a core of between about 3"-6", and wherein the materials/substrate has a thickness of from about 1 mil to about 20 mil.

7. The industrial printing apparatus of claim 6 wherein the apparatus is configured to maintain the roll material/substrate in an uncontaminated state during processing.

8. The industrial printing apparatus of claim 7 wherein the apparatus is configured to provide aseptic packaging in an uncontaminated state for use as FDA-compliant food-safe and beverage-safe packaging for edible food and beverage products.

9. The industrial printing apparatus of claim 8 wherein the apparatus is capable of pre-coating the material/substrate with a coating in a manner wherein the coating does not touch or contaminate an inner layer surface of the roll material/substrate which comes in contact with a food or liquid product.

10. The industrial printing apparatus of claim 8 wherein the apparatus is capable of embellishing the material/substrate to provide an embellished surface in a manner wherein the embellished surface does not touch or contaminate an inner layer surface which comes in contact with a food or liquid product.

11. The industrial printing apparatus of claim 8 comprising a water-based coating device, a UV treatment device and a UV embellishment device.

12. The industrial printing apparatus of claim 11 wherein the apparatus is compliant with FDA rules and regulations applicable to ink, coating, and UV varnish migration.

13. The industrial printing apparatus of claim 1 wherein the at least one drop-in cavity comprises between one and four housing drop-in cavities.

14. The industrial printing apparatus of claim 1 wherein the plurality of mounting rails are configured for mounting and supporting equipment selected from digital embellishment equipment, cold foil unwind/rewind units, and combinations thereof.

15. The industrial printing apparatus of claim 14 wherein the mounting rails are configured to enable the equipment to be slidably mounted thereon so that the position of the equipment on the mounting rails may be slidably adjusted.

16. The industrial printing apparatus of claim 1 wherein the housing further comprises a plurality of housing legs connected to and extending downwardly from the bottom panel.

17. The industrial printing apparatus of claim 16 wherein the housing further comprises a plurality of housing wheels, and wherein each housing wheel of said plurality of housing wheels is connected to and extends downwardly from a housing leg of said plurality of housing legs.

18. The industrial printing apparatus of claim 16 wherein the housing further comprises a plurality of housing feet, and wherein each housing foot of said plurality of housing feet is connected to and extends downwardly from a housing leg of said plurality of housing feet.

19. The industrial printing apparatus of claim 18 wherein the housing further comprises a plurality of housing wheels, and wherein each housing wheel of said plurality of housing wheels is connected to and extends downwardly from a housing foot of said plurality of housing feet.

* * * * *